United States Patent [19]
Son et al.

[11] Patent Number: 5,513,022
[45] Date of Patent: Apr. 30, 1996

[54] METHOD AND APPARATUS FOR DIRECT TRANSMISSION OF AN OPTICAL IMAGE

[75] Inventors: Jung Y. Son; Hyung W. Jeon; Yong J. Choi, all of Seoul, Rep. of Korea; Vladimir I. Bobrinev, Moscow, Russian Federation

[73] Assignee: Korea Institute of Science and Technology, Seoul, Rep. of Korea

[21] Appl. No.: 309,089

[22] Filed: Sep. 20, 1994

[30] Foreign Application Priority Data

Dec. 30, 1993 [KR] Rep. of Korea ...................... 93-31238

[51] Int. Cl.$^6$ ....................................................... G02B 5/32
[52] U.S. Cl. ................... 359/16; 359/10; 359/22; 359/34
[58] Field of Search ................................. 359/1, 3, 7, 10, 359/11, 15, 16, 22, 24, 25, 30, 34, 35; 385/10, 17, 27, 37, 133

[56] References Cited

U.S. PATENT DOCUMENTS

| | | | |
|---|---|---|---|
| 4,223,975 | 9/1980 | Upatnieks | 359/11 |
| 4,432,597 | 2/1984 | Bjorklund et al. | 359/16 |
| 4,902,100 | 2/1990 | Reynolds et al. | 359/15 |
| 5,126,862 | 6/1992 | Hong et al. | 359/7 |

OTHER PUBLICATIONS

Levy et al., "Direct Picture Transmission in a Single Optical Filters with Holographic Fibers", *Optics Communications*, vol. 30, No. 2, Aug. '79, pp. 163–165.
A. Yariv, "Three-dimensional pictorial transmission in optical fibers," Applied Physics Letter, vol. 28, No. 2, pp. 88–89, Jan. 1976.
A. Yariv, "On transmission and recovery of three-dimensional image information in optical waveguides," Journal of Optical Society of America, vol. 66, No. 4, pp. 301–306, Apr. 1976.
A. Gover, C. P. Lee, and A. Yariv, "Direct transmission of pictorial information in multimode optical fibers," Journal of Optical Society of America, vol. 66, No. 4, pp. 306–311, Apr. 1976.
E. G. Paek, et al., "All-optical image transmission through a single-mode fiber," Optics Letters, vol. 17, No. 8, pp. 613–615, Apr. 1992.
A. M. Tai, "Two-dimensional image transmission through a single optical fiber by wavelength-time multiplexing," Applied Optics, vol. 22, No. 23, pp. 3826–3832, Dec. 1983.
Fuji Yoichi and Nishijawa Koichi, "Phase conjugation optical technologies," Advanced Optical Technology, Shofu Books, High-Technology Series, Tokyo, pp. 202–235, 1988.

*Primary Examiner*—Martin Lerner
*Assistant Examiner*—Darren E. Schuberg
*Attorney, Agent, or Firm*—Oblon, Spivak, McClelland, Maier & Neustadt

[57] ABSTRACT

A method and apparatus using a holographic storage medium for direct transmission of an optical image which can compensate for distortions occurring during transmission of the image. An apparatus for direct transmission of an optical image in accordance with the present invention includes a first lens 6c for collimating light from an optical image into a first parallel beam; a transmission medium 2a for transmitting optical signals; a holographic storage medium 1a containing information on distortion of said transmission medium 2a; a mirror 7; a second lens 6d for focusing said first parallel beam passing through said holographic storage medium 1a onto the surface of said mirror 7 and collimating a beam reflected from said mirror 7 into a second parallel beam, the direction of propagation of said second parallel beam being opposite to that of said first parallel beam; a third lens 6a, 6b for directing a phase conjugate wave reproduced from said holographic storage medium 1a by said second parallel beam to said transmission medium 2a; and an image display 4 for displaying said optical signals transmitted through said transmission medium 2a.

25 Claims, 8 Drawing Sheets

METHOD AND APPARATUS FOR DIRECT TRANSMISSION OF AN OPTICAL IMAGE

BACKGROUND OF THE INVENTION

1. Field of the Invention

The present invention relates to direct transmission of optical signals from an image through an optical fiber. More specifically, the present invention relates to a method and apparatus using a holographic storage medium for direct transmission of an optical image which compensates for distortions occurring during transmission of the image.

2. Description of the Related Art

The optical transmission of information in the prior art is achieved by transforming the digitalized signal from one or two dimensional source information into a corresponding light pulse train, and then inputting the light pulse train to an optical fiber by an optical encoding new method. The receiver receives the transmitted information through the process of transforming the transmitted light pulse into a desired form of signals using optical devices and other electronics. However, with this type of information transmission method it is impossible to transmit at high speed a large amount of data such as for HDTV (High Definition TV) or 3-dimensional images.

Therefore, a new communication method was introduced which directly transmits the light from an image through the optical fiber. According to this method, the transmission time can be minimized and the architecture of the transmission system can be simplified, since it is not necessary to transform the electrical signal into an optical signal at the input of the transmission system, or the optical signal received at the receiver back into an electrical signal. Additionally, the transmission of voluminous data is made easier in comparison with the conventional method, since the optical information is transmitted in parallel. Thus, the technique of directly transmitting the optical image through an optical fiber will play an important role in next-generation communications technologies.

However, commercialization of this communication method requires solving the problem of the distortion of the received image due to the distortion of the polarization and loss of the spatial properties of optical information such as images when directly transmitted through optical fibers. Optical fibers used as the transmission media exhibit distortion characteristics caused by scattering, reflection, and coupling of modes when the signal is propagated therethrough, as does translucent glass or plastic. To circumvent this problem, research has recently been conducted on spectral coding and image compensation methods using a phase conjugate wave. However, this research is still in the early stages and a commercially viable transmission method has not yet been developed.

Research conducted so far on conventional methods of direct image transmission has been based upon double pass image transmission in which an original image is reproduced by a double pass of the optical image. As such, this research cannot result in a commercially feasible direct transmission system.

In order to provide a commercially viable solution, a multi-channel system in which information from an image is converted into resolution elements which are transmitted through separate channels allocated for each resolution elememt was presented in "Three-dimensional pictorial transmission in optical fibers," *Applied Physics Letter,* Vol. 28, No. 2, pp 88–89, January 1976 and "On transmission and recovery of three-dimensional image information in optical waveguides," *Journal of Optical Society of America,* Vol. 66, No. 4, pp 301–306, April 1976 by A. Yariv. However, this method was considered to be impractical due to the interaction of modes (modal dispersion) within the optical fiber.

Another method in which resolution elements of an image are transmitted through respective channels using different carriers is discussed in "All-optical image transmission through a single-mode fiber," *Optics Letters,* Vol. 17, No. 8, pp 613–615, Apr. 15, 1992 by E. G. Paek, et al. and "Two-dimensional image transmission through a single optical fiber by wavelength-time multiplexing," *Applied Optics,* Vol. 22, No. 23, pp 3826–3832, December 1983 by A. M. Tai. In this method, light sources with different wavelengths, arranged in rows and columns, are used as carriers for resolution elements of an image. More specifically, the image is first divided into lines by sorting the point light sources in accordance with wavelengths to correspond to resolution elements of the image to be transmitted by means of a diffraction grating. After these lines are rearranged in some manner at the output, images are simultaneously transmitted line by line. However, a drawback of this method is the transmission delay caused by use of the mechanical elements needed to scan the image frame to be transmitted line by line. Theoretically, the real time transmission of the entire image frame can be achieved by utilizing a diffraction grating which can transmit an entire image frame at once instead of line by line. However, a method utilizing such a diffraction grating has not yet been developed.

Recently, a direct image transmission method using a 2D multicolor surface-emitting laser-diode array (MC SELDA) as carriers has been reported in "All-optical image transmission through a single-mode fiber," *Optics Letters,* Vol. 17, No. 8, pp 613–615, Apr. 15, 1992 by E. G. Paek et at. According to this method, the transmission of a complex image is made possible by using separate laser diodes of different wavelengths for each resolution element of the image to be transmitted. This method has also not been put to practical use since an array element with many laser diodes of different wavelengths is required.

Another method currently being studied in the field of direct transmission of images is an image compensation method using a phase conjugate wave in which an optical signal is passed through a first optical fiber and then through an ideal optical fiber similar in optical characteristics to the first optical fiber, as described in "Three-dimensional pictorial transmission in optical fibers," *Applied Physics Letter,* Vol. 28, No. 2, pp 88–89, January 1976 by A. Yariv. However, this is not a viable approach since it is impossible to make two optical fibers sufficiently similar to each other. Thus, research related to this method is directed mainly towards the application to a fiber optic gyroscopes, etc., in which the distortion is compensated for by looping the transmitted signal back through the same optical fiber that it first passed through. In addition to this, direct transmission of images using two consecutive waves shown in the publication, "Phase conjugation optical technologies," *Advanced Optical Technology,* SHOFU BOOKS, High-Technology Series, Tokyo, pp 202–235, 1988 by Fuji Yoichi and Nishijawa Koichi has not been achieved since a photorefractive crystal may not eliminate the distortion of the signal beam due to difficulties caused by the coupling of four waves in controlling image information of the signal beam by a reference beam.

Hence, a need exists in the art for an improved method of direct image transmission.

SUMMARY OF THE INVENTION

The need in the art is addressed by the present invention, which provides an improved method and apparatus for direct transmission of an optical image by allocating a separate channel for each resolution element of the image, and compensating for distortions occurring during transmission of the image using the phase conjugate wave reproduced from a holographic storage medium.

Figure 1:
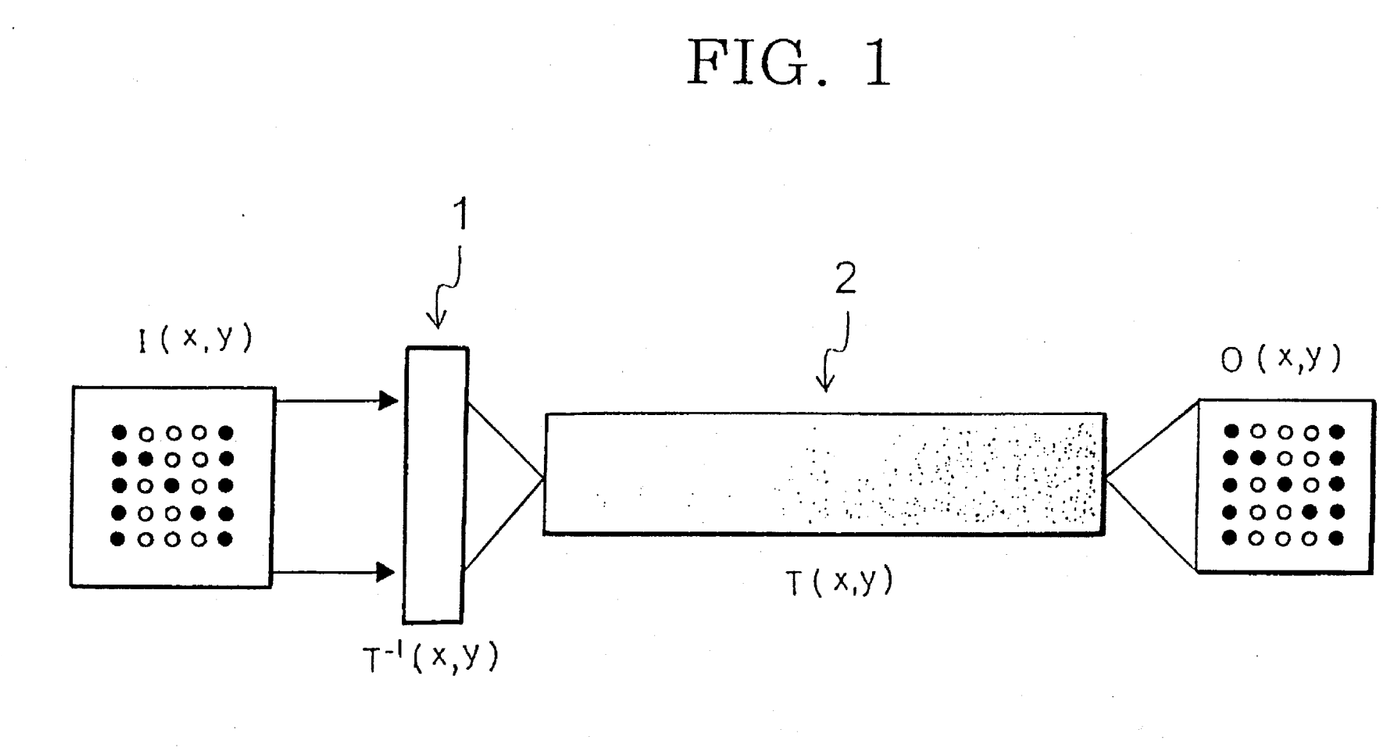
FIG. 1 illustrates concepts of the present invention in which an image is transmitted in parallel through a distortion medium by using a phase conjugate wave.

According to the present invention, an output image O(x, y) may be obtained as shown in FIG. 1 by using a holographic storage medium having the characteristics $T^{-1}(x, y)$ in order to compensate for T(x, y), which is the distortion caused by medium 2 when the resolution element from input image I(x, y) propagates through medium 2. That is, if an image frame "N" is transmitted at the input of the transmitter, the same image "N" may be obtained at the output of the receiver.

Figure 2:
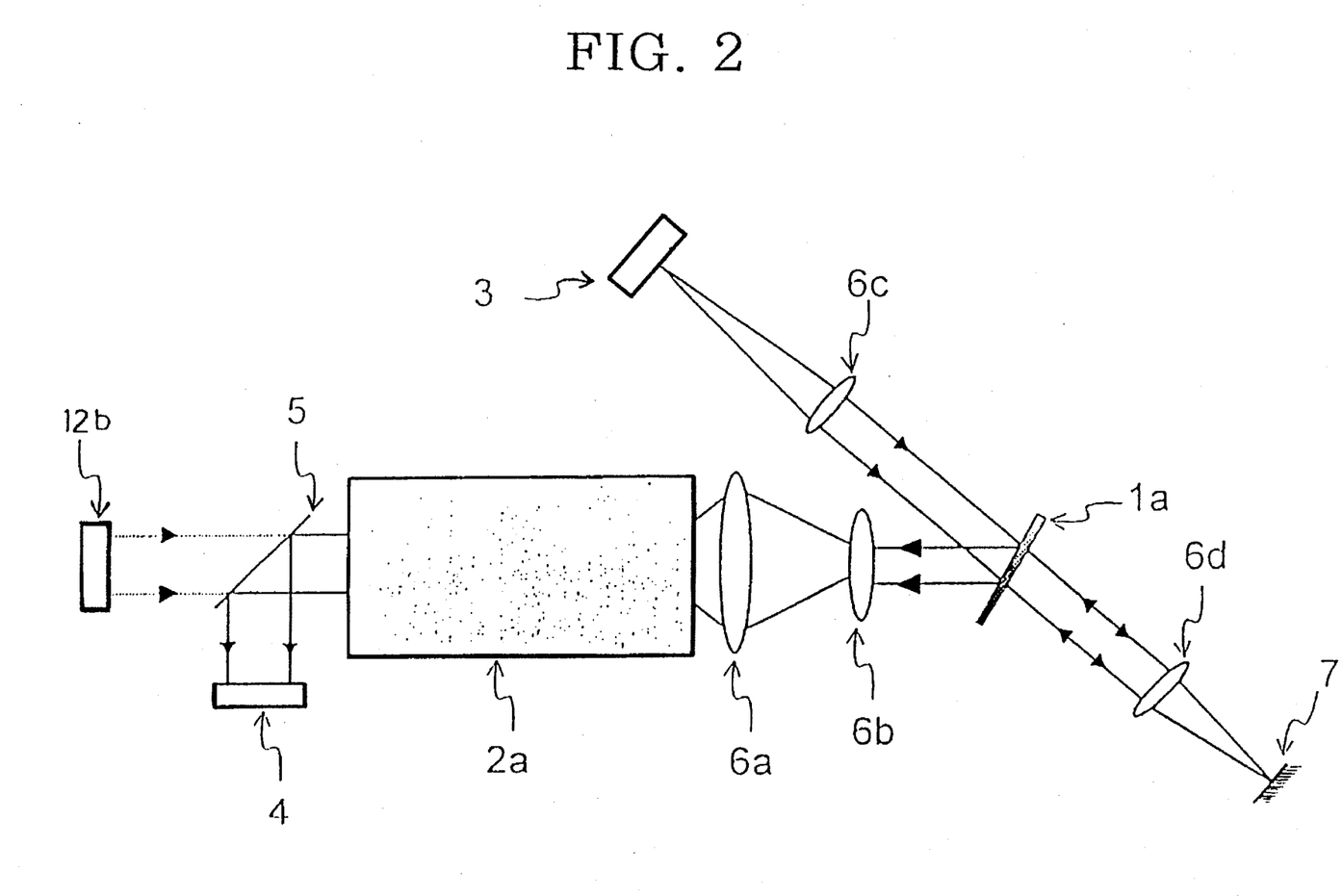
FIG. 2 is a schematic view showing an apparatus which transmits an image in parallel through a distortion medium by using a holographic storage medium in accordance with the teachings of the present invention.

Referring to FIG. 2, an apparatus for direct transmission of an optical image in accordance with the present invention comprises a first lens means 6c for collimating light from an optical image into a first parallel beam; a transmission medium 2a for transmitting optical signals; a holographic storage medium 1a containing information on distortion of said transmission medium 2a; a mirror 7; a second lens means 6d for focusing said first parallel beam passing through said holographic storage medium 1a onto the surface of said mirror 7 and collimating a beam reflected from said mirror 7 into a second parallel beam, the direction of propagation of said second parallel beam being opposite to that of said first parallel beam; a third lens means 6a, 6b for directing a phase conjugate wave reproduced from said holographic storage medium 1a by said second parallel beam to said transmission medium 2a; and an image display 4 for displaying said optical signals transmitted through said transmission medium 2a.

BRIEF DESCRIPTION OF THE DRAWINGS

The aforementioned aspects and other features of the invention are explained in the following description, taken in connection with the accompanying drawings wherein:

FIG. 6A–FIG. 6H shows experimental results which may be obtained when the optical images are transmitted through the optical fibers in accordance with the teachings of the present invention.

DETAILED DESCRIPTION OF THE INVENTION

Figures 3, 3A, 3B:
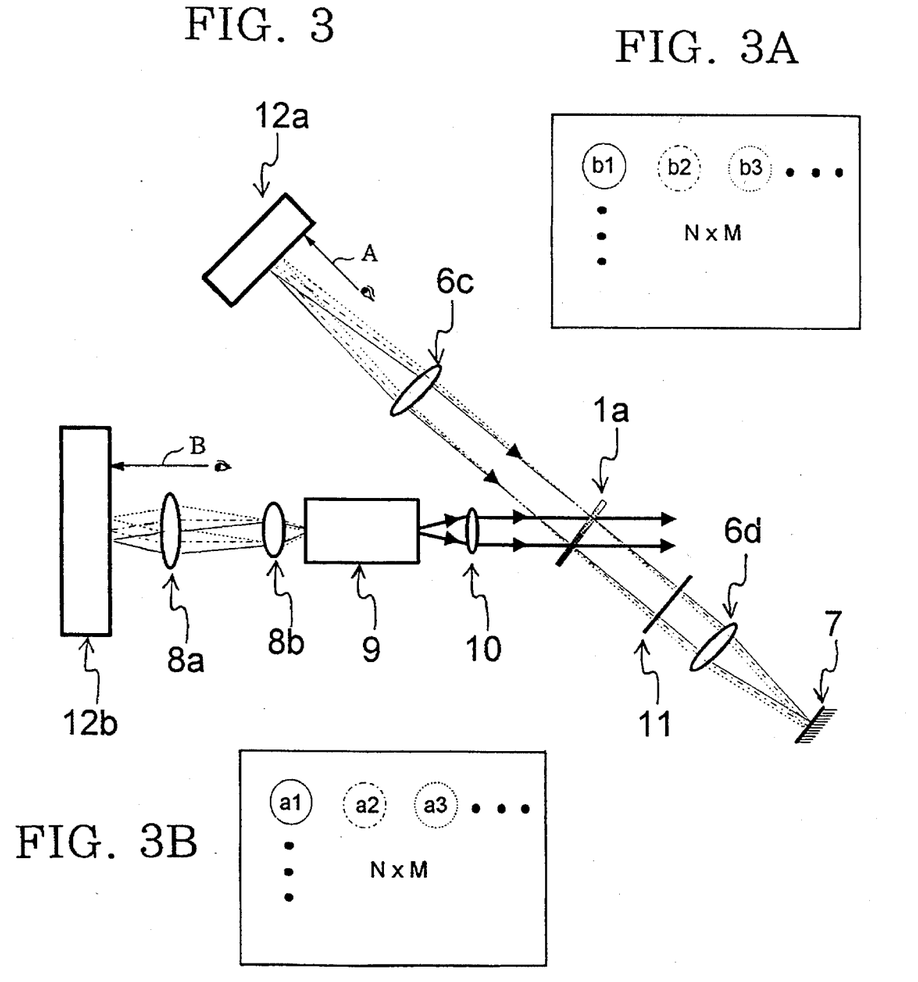
FIG. 3 is a view explaining the process of recording a distortion-compensating holographic storage medium.
FIG. 3A and FIG. 3B are views showing resolution elements of light arrays.

FIG. 2 is a schematic view showing an apparatus which transmits an image in parallel through distortion medium 2a by using a holographic storage medium in accordance with the present invention, wherein reference numeral 3 designates an optical image source at the input, and the output appears at the image display 4. FIG. 3 explains the process of recording a distortion-compensating holographic storage medium which transmits N×M resolution elements. The light arrays 12a, 12b are placed respectively at the input and output of the medium 9 to record distortion information of the medium 9 on the holographic storage medium 1a. The light source which can be used as an N×M light array include an array hologram, a laser diode array, and a spatial light modulator well known to be a spatial element.

FIG. 3A and FIG. 3B illustrate resolution elements of light arrays 12a, 12b as viewed from the directions A and B respectively.

The process of recording a holographic storage medium in FIG. 3 is described in detail below. Only resolution elements b 1 and a1 of light arrays 12a, 12b are allowed to pass through the lens 6c and the medium 9 respectively to record a holographic storage medium, and then the same procedure is sequentially repeated for the neighbouring resolution elements. The light from one resolution element of the light source 12b is scattered during passage through medium 9, and the light scattered by medium 9, after being directed to the lens 6a (in FIG. 2), is collimated into a parallel beam using another lens 10 (6b in FIG. 2). By using a collimated parallel beam as above, noise can be considerably reduced since interference effects can be enhanced during multiple recording of the holographic storage medium and higher reproduction efficiency can be achieved, thereby avoiding the superposition of phase conjugate waves reproduced from the holographic storage medium by different resolution elements. This parallel beam is illuminated as a signal beam on the holographic storage medium, while the resolution element from the light source at the input, which corresponds one-to-one to the resolution element from the light source 12b, is collimated into a parallel beam using a lens 6c and illuminated on the holographic storage medium as a reference beam. The holographic storage medium in the present invention may include a hologram plate used in manufacturing the hologram transparently, more preferably, an opto-refractive crystal such as $LiNbO_3$ which is effective in preventing noise from resulting from nonlinearity of a surface when the recorded interference pattern is reproduced. In this way, the multiply exposed holographic storage medium can be obtained by sequentially illuminating the lights which correspond to resolution elements of N×M light arrays 12a, 12b thereon.

Using the holographic storage medium recorded as described above, the image source at the input can be reproduced at the output. The light illuminated from the image source 3 at the input in FIG. 2 passes through the holographic storage medium, and is reflected through a lens 6d by the mirror 7. The recorded holographic storage medium is then reproduced as the beam reflected from the mirror 7 is illuminated thereon in the opposite direction to that when the holographic storage medium is first illuminated. The phase conjugate wave which is the reproduced holographic wave retraces the path through which the beam first passed at the time of recording to reproduce the image source transmitted at the input. That is, an exact image of the image source at the input is formed at the position of the light source 12b. Therefore, after recording the holographic storage medium for image-compensation 1a, the image can be reproduced by eliminating the light source 12b from the input and establishing an image display. Alternatively, a beam splitter 5 may be used to direct the beam to the desired position so that the reproduced image is formed at the image display 4. The image display may be a charge coupled device which is frequently used in forming images, or a phosphor type imaging element. Note that angles between the signal beams which passed through the transmission medium at the time of recording and the parallel beams which were formed from the image source 3 at the input are unique. Since a holographic storage medium can be reproduced only by a beam incident at an angle coincident with the incident angle at the time of recording, the reproduction efficiency of the holographic storage medium by other superposed and neighbouring resolution elements is poor. As a result, elements other than the corresponding resolution element from the image source at the input do not appear at the image display 4. Therefore, if the holographic storage medium for image-compensation is illuminated by resolution elements from the image source 3 at the input, the image may be displayed at the image display 4.

Alternatively, the present invention may be applied to the design of sensors using the fact that the holographic storage medium for image-compensation should be recorded according to the optical properties or distortion characteristics of the medium to faithfully reproduce the transmitted image. For example, any changes in the physical characteristics such as temperature or pressure on the medium will lead to obtaining an image different from that originally transmitted unless the holographic storage medium is changed accordingly. Therefore, detection of any changes in the given physical characteristics can be rendered by comparing the original image with the received image.

Illustrative embodiments and applications will now be described with reference to the accompanying drawings to disclose the advantageous teachings of the present invention.

Figure 4:
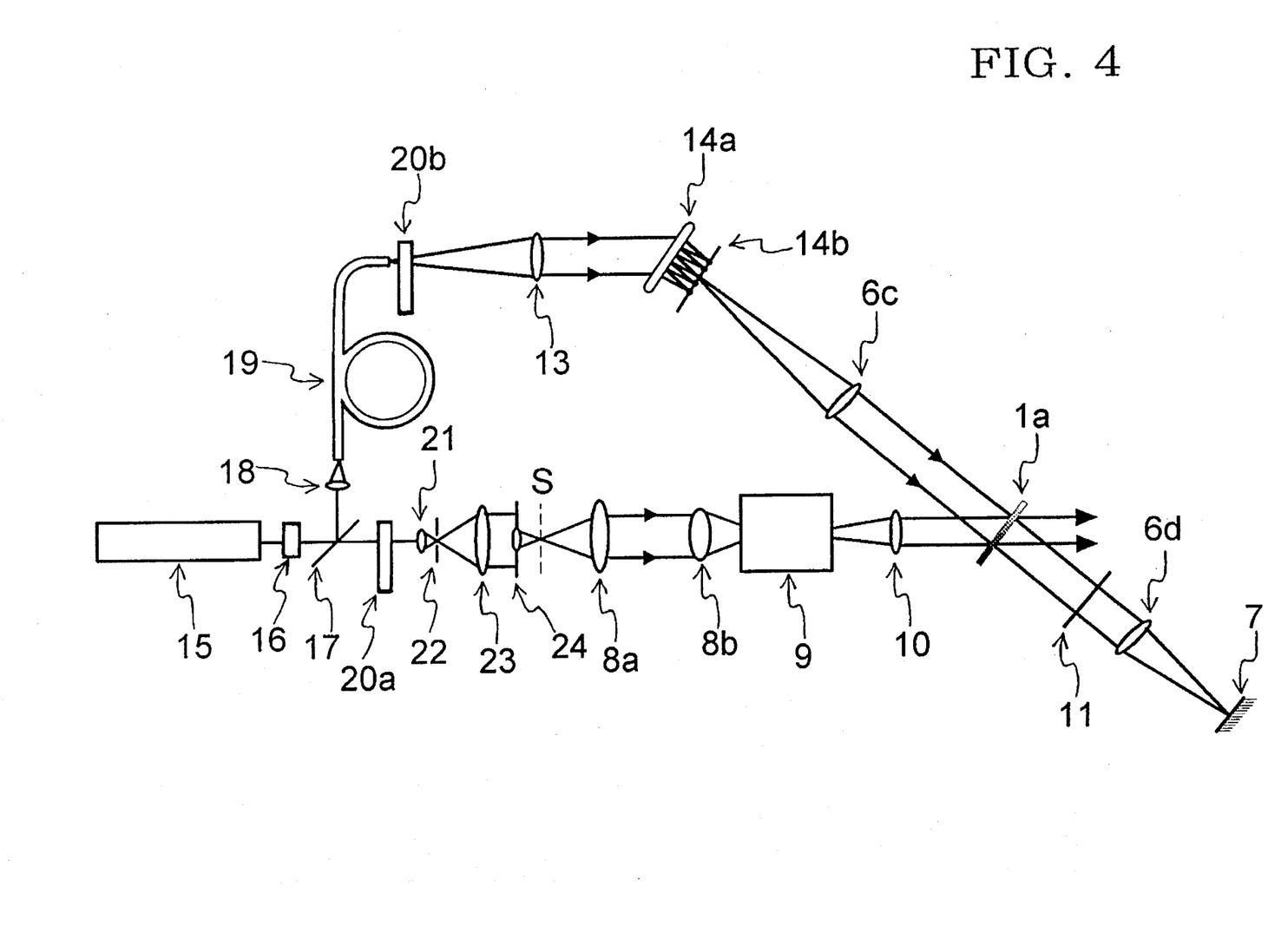
FIG. 4 shows an apparatus for recording a distortion-compensating holographic storage medium in accordance with the teachings of the present invention.

First, the method of recording the holographic storage medium for image-compensation will be further explained with reference to FIG. 4, which shows an apparatus for recording a distortion-compensating holographic storage medium in accordance with the teachings of the present invention. The light from the laser 15 is utilized as a signal beam necessary to record the holographic storage medium. The light from the laser 15 is allowed to pass via an object lens 21 through the pin hole 22. The beam which passed through the pin hole 22 diverges and is collimated into a parallel beam after passing through the lens 23. The outer portion of the beam from the lens 24 is blocked by a screen 26 with a lens 24 attached. The beam from the lens 24 is focused to form a point light source on the S plane. This beam from the S plane is incident upon the optical fiber 9, and then illuminated as a parallel beam on the holographic storage medium by a lens 10.

Because the holographic storage medium contains recorded information of the interference pattern formed by two coherent beams, a beam split from the laser 15 at the output side by a beam splitter 17 is used as the reference beam so that the reference beam is coherent with the signal beam. The beam split by the beam splitter 17 is fed through the lens 18 to the optical fiber 19 whose length is approximately equal to the length of the optical fiber 9. In the optical fiber, the beam follows the bending of the optical fiber and is collimated into a parallel beam using a lens 13. This beam is illuminated as a reference beam on the hologram 14a on which point light sources of an N×M array are recorded to reproduce the recorded point light sources. Then, only the point light source corresponding to one resolution element is illuminated as a parallel beam on the holographic storage medium through a lens 6c by using a screen 14b having a hole. The hologram 14a was used only to form an exact point light source. After adjusting the amount of the beam illuminated on the holographic storage medium by a variable attenuator 20a, 20b, the transparent holographic storage medium 1a is positioned at the exact location with shutters 11, 16 closed. The holographic storage medium is then recorded with the shutter 16 opened.

Next, the shutter 16 is closed and the lens 24 is moved to the position corresponding to the neighbouring resolution element to be recorded. The corresponding point light source in the screen 14b is allowed to pass, and the shutter 16 is opened to record the holographic storage medium from the neighbouring resolution element. In this way, the beams corresponding to resolution elements of an N×M array are sequentially illuminated to produce the multiply exposed holographic storage medium. If the holographic storage medium, after being developed and bleached, is placed at the exact position when the recording is performed, it can be used as the hologram element to transmit N×M resolution elements.

Figure 5:
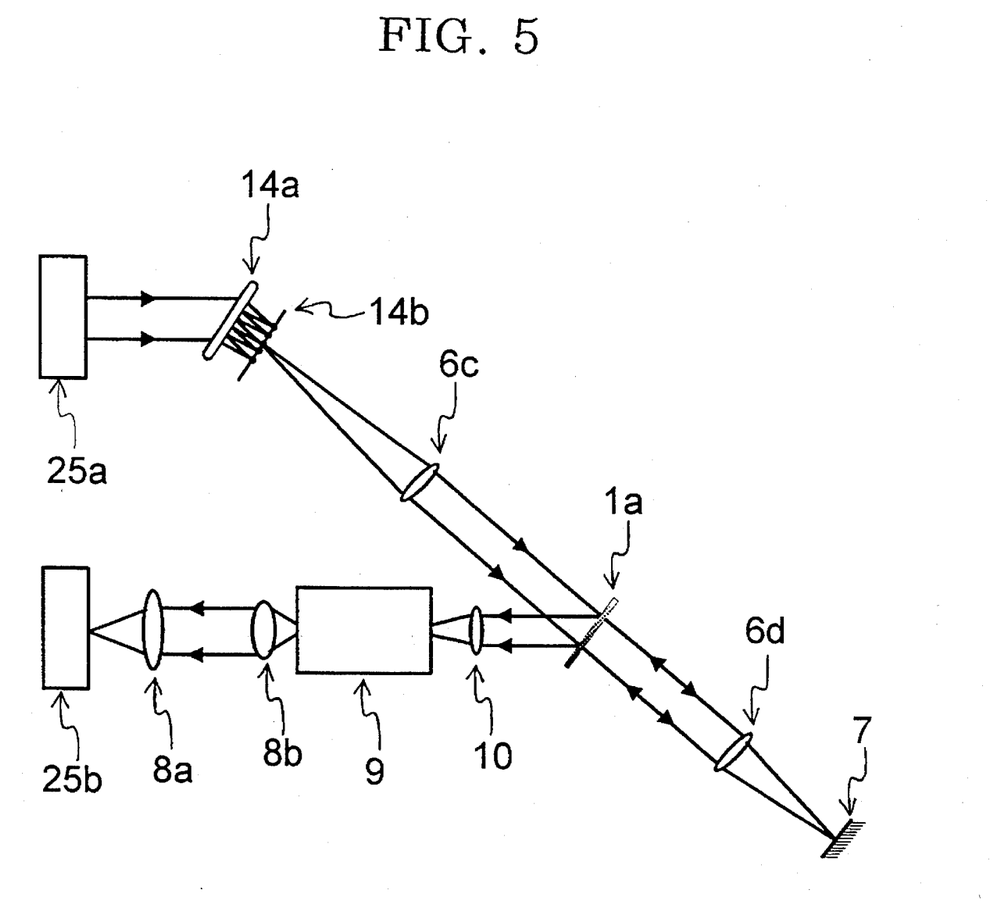
FIG. 5 shows an apparatus for direct transmission of an optical image through an optical fiber in accordance with the teachings of the present invention.
Figure 6A:
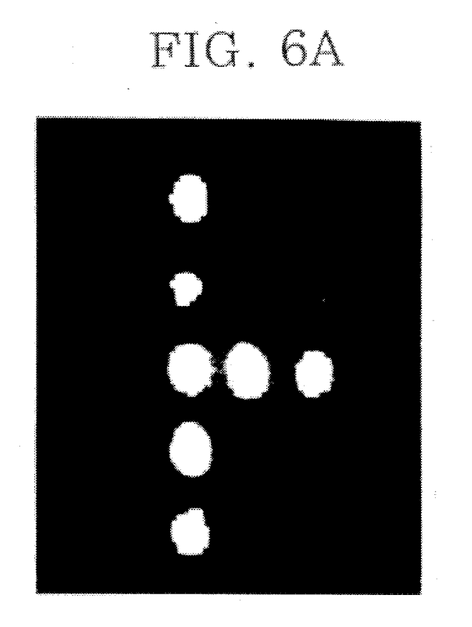
Figure 6B:
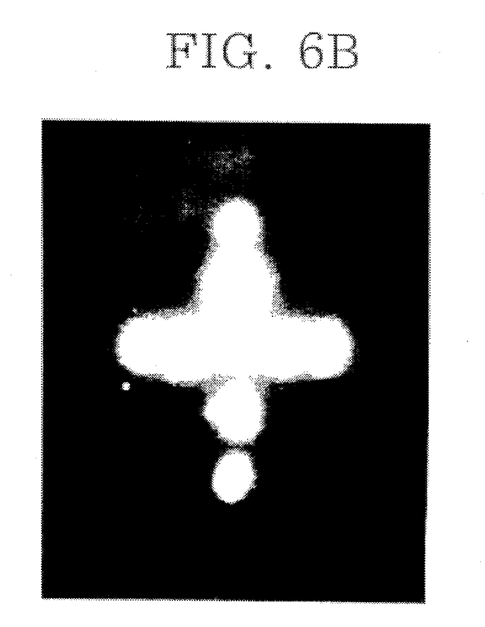
Figure 6C:
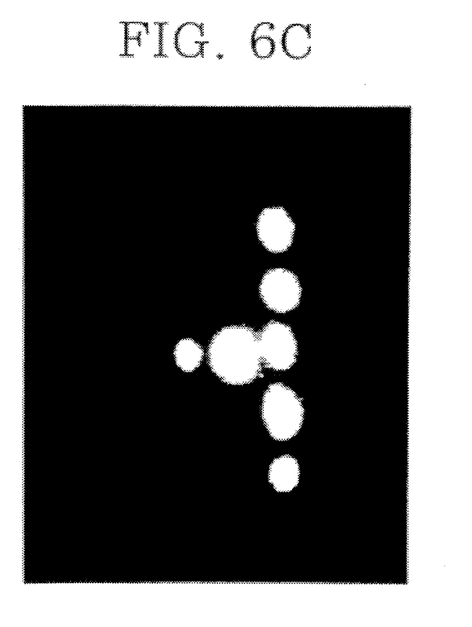
Figure 6D:
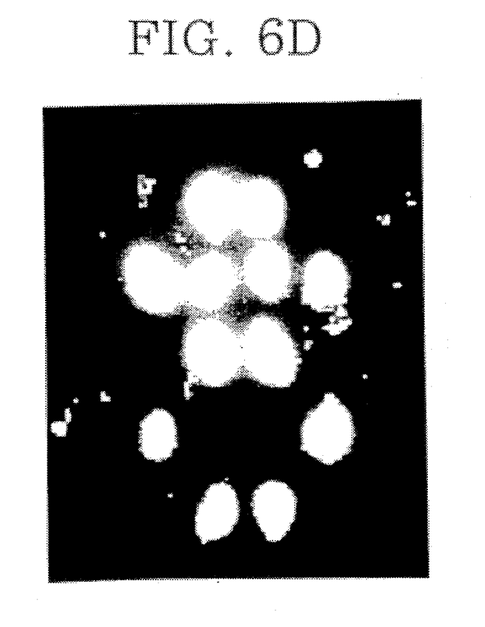
Figure 6E:
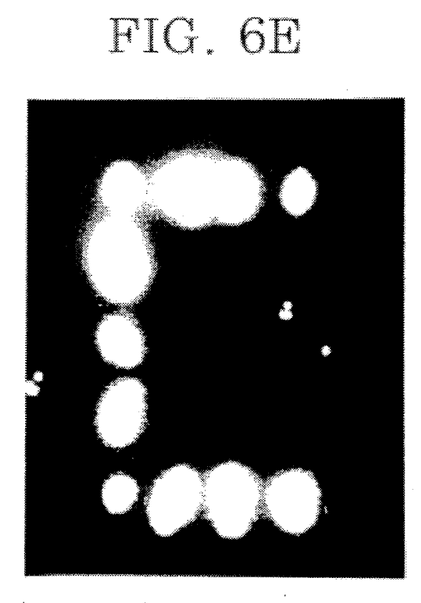
Figure 6F:
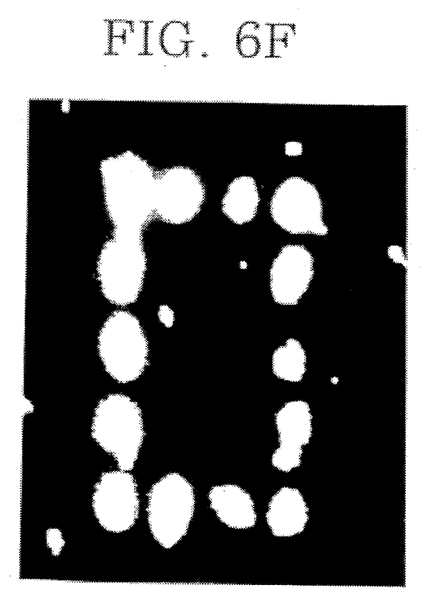
Figure 6G:
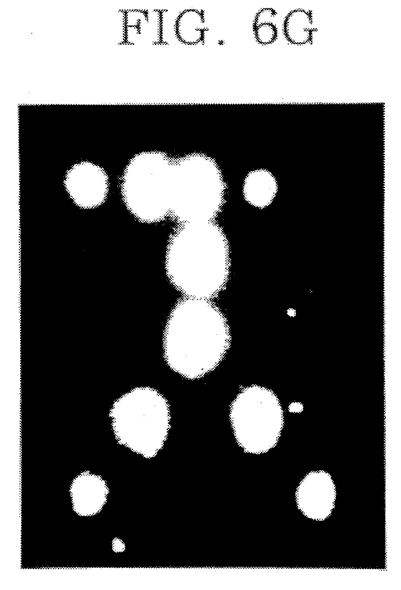
Figure 6H:
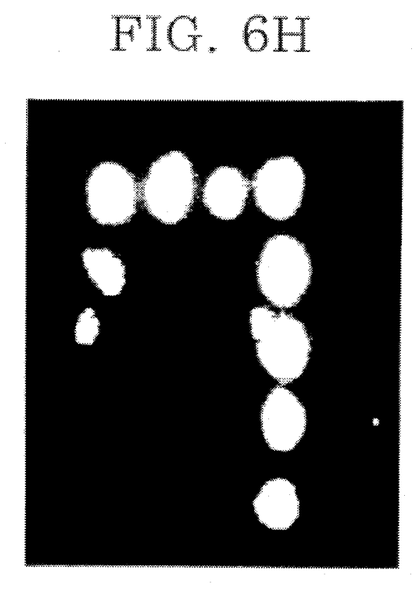

FIG. 5 is a view showing an apparatus for direct transmission of an optical image through an optical fiber using the holographic storage medium recorded in accordance with the method described hereinabove. In FIG. 5, a CCD camera 25b is placed on the S plane at the backside of a lens 8a, forming the output. The image source 25a illuminating the parallel beam is placed at the input. The shutter 11 (FIG. 4) closed at the time of recording is opened to reproduce the holographic storage medium, and the beam which passed through the holographic storage medium is focused on the mirror 7 by means of a lens 6d. The beam reflected by the mirror 7 is used as a reference beam to reproduce the holographic storage medium. The holographic storage medium reproduced in this way performs as an element for compensating the image distorted by the optical fiber when the beam is transmitted therethrough, thus allowing the direct transmission of an optical image through the channel.

FIG. 6A–FIG. 6H is a view showing experimental results which may be obtained when the optical images are transmitted through the optical fibers of which diameter is 62 μm by using the holographic storage media recorded with 5×5 resolution elements. Since the resolution element transmitted to the S plane by the holographic storage medium for image-compensation has a diameter of approximately 100 μm and its total field of view is 1.66 mm, the optical fiber can resolve up to 15–16 resolution elements. However, to prevent interference between resolution elements, the spacing between resolution elements should not fall below 150 μm. It is not necessary for the shape of resolution element to be limited to a circle as illustrated in FIG. 6A–6H.

Figure 7:
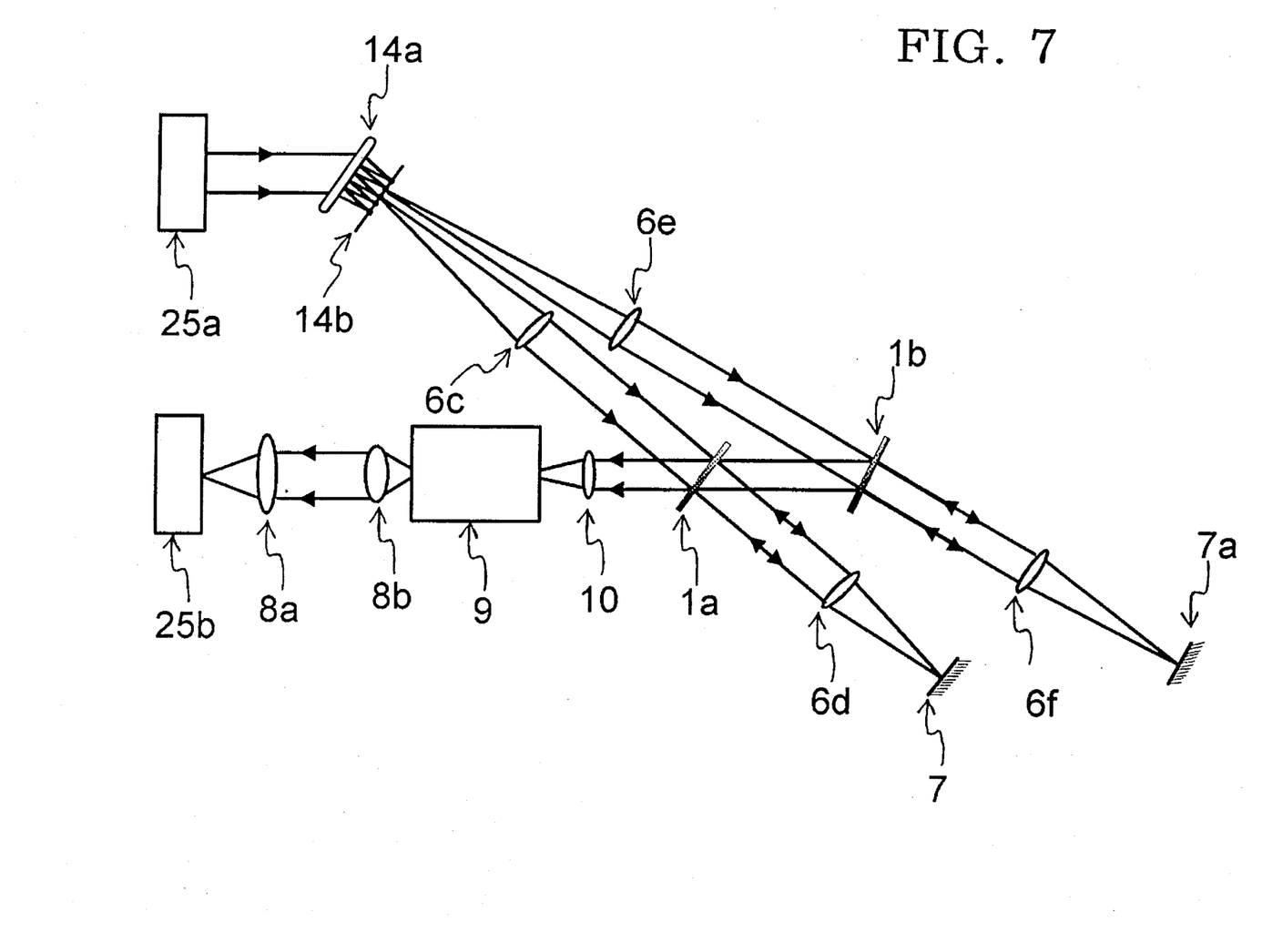
FIG. 7 shows another embodiment of the present invention in which a plurality of holographic storage media for image compensation are used to enhance the image transmission efficiency.

FIG. 7 is a view showing another embodiment of the present invention in which a plurality of holographic storage media for image compensation are used to enhance the efficiency of image transmission. When only a single holographic storage medium for image-compensation is used, some noise is incurred from too much multiple exposure. To reduce the noise level, multiple holographic storage media for image-compensation may be used in order to allow more resolution elements to be transmitted and to distribute the recording amount of the holographic storage medium to be multiply exposed within the range that the excessive noise does not occur. Therefore, according to the method using the multiple holographic storage media, an image can be transmitted with high quality. This high quality obtained is attributable to the fact that a large amount of resolution elements can be transmitted with a high signal-to-noise ratio.

As mentioned above, reduction of transmission time and the simplification of the system architecture can be achieved according to the teachings of the present invention, since the optical image can be directly transmitted through an optical fiber by compensating for distortions occurring during transmission of an image. But, in the case of transmission of 512×512 images generally used, many devices of the present invention incorporating the optical fibers should be used in parallel since only a portion of a 512×512 image can be transmitted by an apparatus for direct transmission according to the present invention.

The present invention has been described with reference to a particular embodiment in connection with a particular application. Those having ordinary skill in the art and access to the teachings of the present invention will recognize additional modifications and applications within the scope thereof. For example, the invention is not limited to the use of the optical fiber as a transmission media. Further it will be appreciated by those skilled in the art that the optical lens means used in the present invention may be disposed differently from the arrangements depicted herein as occasion demands.

It is therefore intended by the appended claims to cover any and all such applications, modifications, and embodiments within the scope of the present invention.

What is claimed is:

1. An apparatus for direct transmission of an optical image comprising:

a first lens means for collimating light from said optical image into a first parallel beam;

a transmission medium for transmitting optical signals;

a holographic storage medium containing information on distortion of said transmission medium;

a mirror;

a second lens means for focusing said first parallel beam passing through said holographic storage medium onto the surface of said mirror and collimating a beam reflected from said mirror into a second parallel beam, the direction of propagation of said second parallel beam being opposite to that of said first parallel beam;

a third lens means for directing a phase conjugate wave reproduced from said holographic storage medium by said second parallel beam to said transmission medium; and an image display for displaying said optical signals transmitted through said transmission medium.

2. The apparatus of claim 1 wherein said first lens means, said holographic storage medium, said second lens means, and said mirror are collinearly aligned.

3. The apparatus of claim 1 wherein said third lens means and said holographic storage medium are disposed at the input of said transmission medium.

4. The apparatus of claim 1 further comprising a beam splitter for directing said optical signals transmitted through said transmission medium to said image display.

5. The apparatus of claim 1 wherein said holographic storage medium includes a hologram plate or a photorefractive crystal.

6. The apparatus of claim 1 wherein said transmission medium includes an optical fiber.

7. The apparatus of claim 1 wherein said image display is made up of a charge coupled device.

8. An apparatus for direct transmission of an optical image comprising:

a plurality of first lens means for collimating light from said optical image into a plurality of first parallel beams;

a transmission medium for transmitting optical signals;

a plurality of holographic storage media containing information on distortion of said transmission medium;

a plurality of mirrors;

a plurality of second lens means for focusing each of a plurality of first parallel beams passing through each of said plurality of holographic storage medium onto the respective surface of said plurality of mirrors and collimating beams reflected from each of said plurality of mirrors into a plurality of second parallel beams, the directions of propagation of said plurality of second parallel beams being opposite to those of said plurality of first parallel beams;

a third lens means for directing phase conjugate waves reproduced from said plurality of holographic storage medium by said plurality of second parallel beams to said transmission medium; and an image display for displaying said optical signals transmitted through said transmission medium.

9. The apparatus of claim 8 wherein respective sets of said plurality of first lens means, said plurality of holographic storage media, said plurality of second lens means, and said plurality of mirrors are collinearly aligned.

10. The apparatus of claim 8 wherein said third lens means and said plurality of holographic storage media are disposed at the input of said transmission medium.

11. The apparatus of claim 8 further comprising a beam splitter for directing said optical signals transmitted through said transmission medium to said image display.

12. The apparatus of claim 8 wherein said plurality of holographic storage media include hologram plates or photorefractive crystals.

13. The apparatus of claim 8 wherein said transmission medium includes an optical fiber.

14. The apparatus of claim 8 wherein said image display is made up of a charge coupled device.

15. A method for direct transmission of an optical image comprising the steps of:

collimating light from said optical image into a first parallel beam;

passing said first parallel beam through a holographic storage medium containing information on distortion of a transmission medium and focusing said first parallel beam onto the surface of a mirror;

collimating a beam reflected from said mirror into a second parallel beam;

reproducing a phase conjugate wave by passing said second parallel beam through said holographic storage medium;

directing said phase conjugate wave to said transmission medium; and displaying optical signals from said transmission medium on an image display.

16. The method of claim 15 wherein said first and second parallel beams collimated respectively by said collimating steps propagate to the opposite direction with each other.

17. The apparatus of claim 15 wherein said holographic storage medium includes a hologram plate or a photorefractive crystal.

18. The apparatus of claim 15 wherein said transmission medium includes an optical fiber.

19. The apparatus of claim 15 wherein said image display is made up of a charge coupled device.

20. A method for recording a holographic storage medium for image compensation comprising the steps of:

providing a light from a selected resolution element of an output light array;

directing said light to a first transmission medium;

collimating said light from said first transmission medium into a first parallel beam and illuminating said first parallel beam as a signal beam on said holographic storage medium;

collimating a light from a resolution element of an input light array which corresponds to said light from said selected resolution element into a second parallel beam, and illuminating said second parallel beam as a reference beam on said holographic storage medium;

determining if there are more resolution elements to be recorded; and selecting a next resolution element from said output light array and repeating said providing step through said determining step if there are more resolution elements, the step of providing a light comprising the steps of:

passing said light from said selected resolution element of said output light array via an object lens through a pin hole;

enlarging said passed light by using a first lens and collimating said enlarged light into a third parallel beam; and moving a second lens to a position corresponding to that of said resolution element so that said third parallel beam is allowed to pass through said second lens, said second lens being attached to a screen by which the outside beam portion of said second lens is blocked.

21. The method of claim 20 wherein said holographic storage medium includes a hologram plate or a photorefractive crystal.

22. The method of claim 20 wherein said output light array includes a laser light.

23. The method of claim 20 wherein said first transmission media includes an optical fiber.

24. A method for detecting any changes in the physical characteristics of transmission media comprising the steps of:

collimating a light from an optical resolution element image into a first parallel beam;

passing said first parallel beam through a holographic storage medium containing information on distortion of said transmission media and focusing said first parallel beam onto the surface of a mirror;

collimating a beam reflected from said mirror back into a second parallel beam;

reproducing a phase conjugate wave by passing said second parallel beam through said holographic storage medium;

directing said phase conjugate wave to said transmission media; and comparing the optical information from said transmission media with said optical resolution element image.

25. The method of claim 24 wherein said first and second parallel beams propagate to the opposite direction with each other.

* * * * *